United States Patent [19]

Mainard et al.

[11] Patent Number: 5,470,087
[45] Date of Patent: Nov. 28, 1995

[54] SHOPPING CART HAVING GATE HINGED TO HANDLE

[75] Inventors: Tommy D. Mainard; James F. Reinbold, both of Wagoner, Okla.

[73] Assignee: UNR Industries, Inc., Chicago, Ill.

[21] Appl. No.: 375,604

[22] Filed: Jan. 20, 1995

Related U.S. Application Data

[63] Continuation-in-part of Ser. No. 171,237, Dec. 21, 1993, Pat. No. 5,397,140.

[51] Int. Cl.$^6$ ..................................................... B62B 11/00
[52] U.S. Cl. ........................... 280/33.992; 280/33.991; 280/DIG. 4; 16/373; 403/260; 411/501
[58] Field of Search ................... 280/33.991–33.993, 280/33.995–33.998, 79.3, 651, 655, 47.34, 47.36, DIG. 3, DIG. 4; 411/500, 501; 403/246, 247, 249, 252, 260, 379; D34/12; 16/254, 373; 220/4.28, 4.29

[56] References Cited

U.S. PATENT DOCUMENTS

| | | | |
|---|---|---|---|
| D. 155,971 | 8/1948 | Concklin | D14/3 |
| 2,501,567 | 3/1950 | Huck | 411/501 |
| 2,689,134 | 9/1954 | Lachance | 280/33.997 |
| 2,931,532 | 4/1960 | Gapp | 411/501 |
| 3,023,018 | 2/1962 | Welter | 280/33.993 |
| 3,361,438 | 1/1968 | Davis | 280/33.991 |
| 3,433,496 | 3/1969 | Kampf | 280/33.991 |
| 3,519,292 | 7/1970 | Krikorian | 403/260 |
| 3,614,133 | 10/1971 | Ganci | 280/33.991 |
| 3,717,358 | 2/1973 | Mills | 280/33.991 |
| 3,912,291 | 10/1975 | Frisch | 280/33.992 |
| 4,046,394 | 9/1977 | Thompson | 280/33.991 |
| 5,289,936 | 3/1994 | Jones et al. | 280/33.991 |
| 5,397,140 | 3/1995 | Mainard | 280/33.991 |

FOREIGN PATENT DOCUMENTS

| | | | |
|---|---|---|---|
| 0364655 | 4/1990 | European Pat. Off. | 280/33.991 |

*Primary Examiner*—Anne Marie Boehler
*Attorney, Agent, or Firm*—Dressler, Goldsmith, Shore & Milnamow, Ltd.

[57] ABSTRACT

In a shopping cart comprising an undercarriage, a handle having two tubular portions extending generally upwardly from the undercarriage, and a basket mounted to the undercarriage and the handle, the basket has a gate hinged to the tubular portions of the handle via a hinge wire extending along an upper edge of the gate. Two tubular sleeves are fixed to the handle, each extending through an inwardly opening aperture in an associated one of the tubular portions of the handle. Each end portion of the hinge wire extends into one of the tubular sleeves. Two rivets are fixed to the handle, each having an outside head, a tubular shank extending inwardly through an outwardly opening aperture in an associated one of the tubular portions of the handle and through an associated sleeve, and a mandrel drawn outwardly into the shank so as to expand the shank and the associated sleeve. As disposed within the tubular portions of the handle, the mandrels of the rivets permit but limit axial movement of the hinge wire relative to the tubular sleeves, the tubular portions of the handle, and the retaining structures. In one contemplated embodiment, each tubular sleeve has an annular flange bearing against an outer margin of an associated one of the outwardly opening apertures. In an alternative embodiment, each tubular sleeve has an outer end portion disposed within one of the tubular handle portions of the handle.

6 Claims, 2 Drawing Sheets

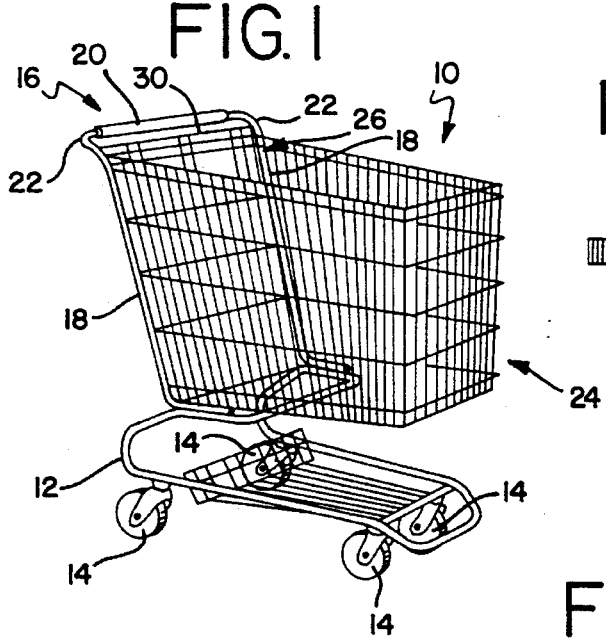
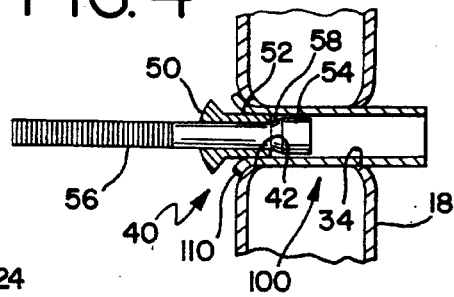
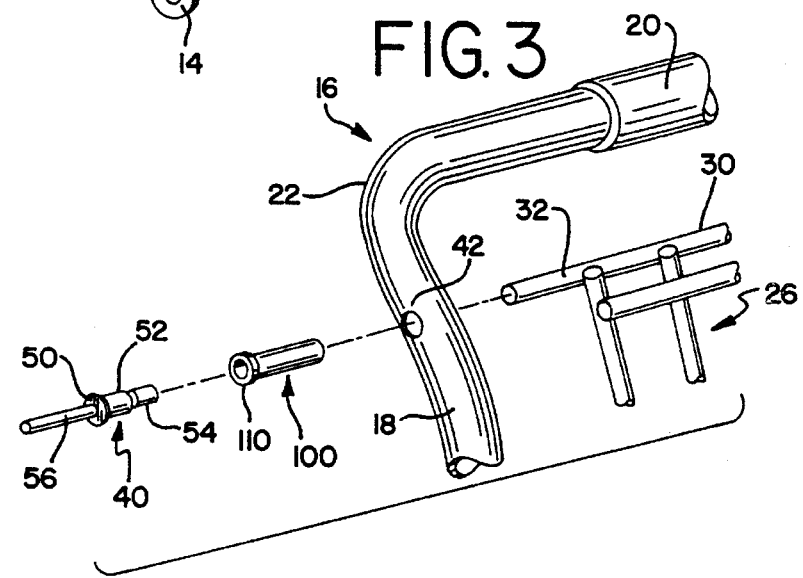
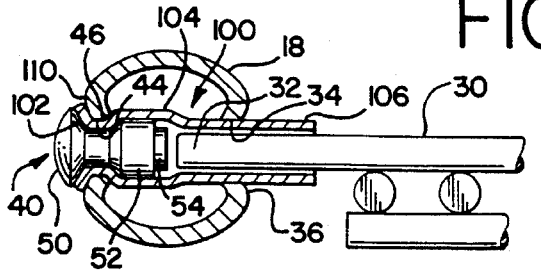
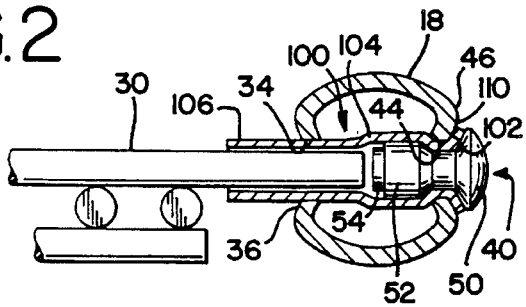

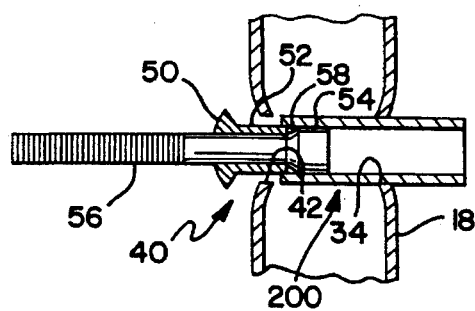
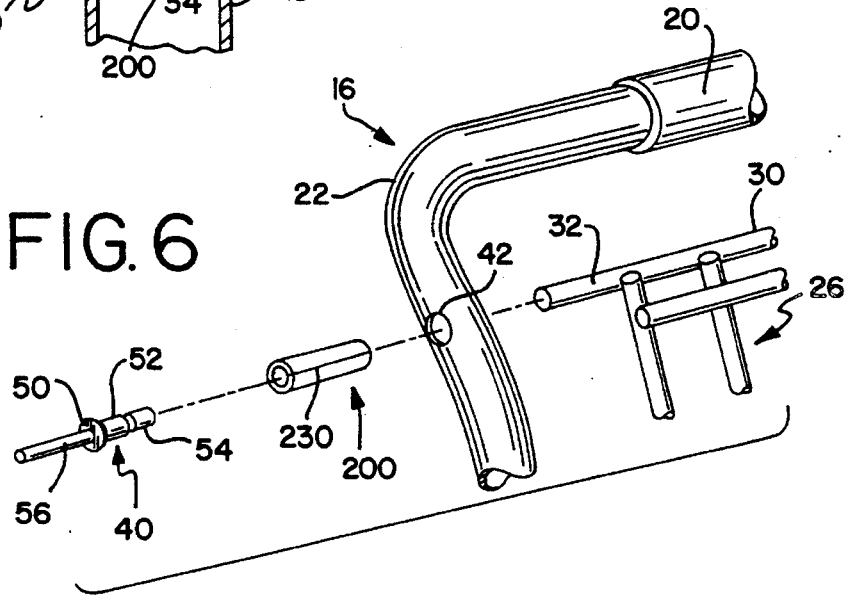
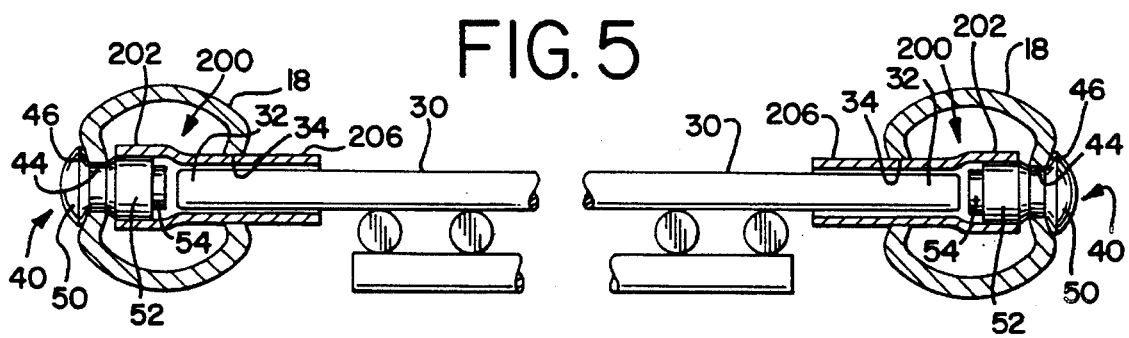
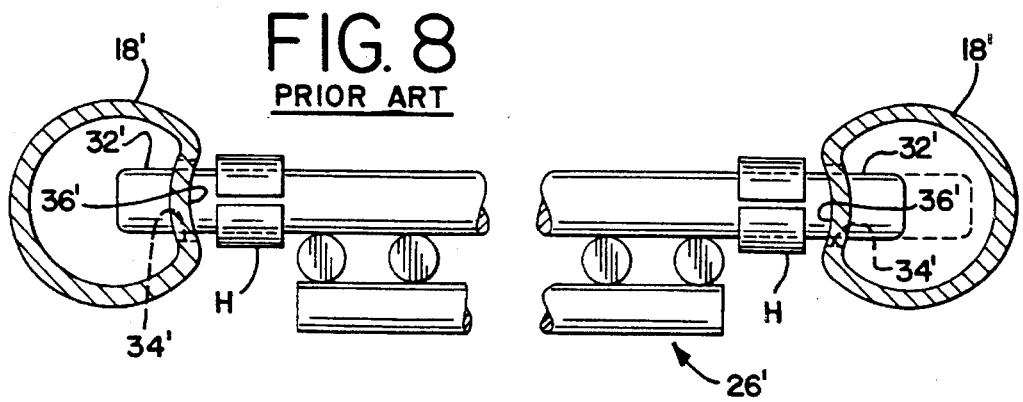

5,470,087

SHOPPING CART HAVING GATE HINGED TO HANDLE

CROSS-REFERENCE TO RELATED APPLICATION

This application is a continuation-in-part of U.S. patent application Ser. No. 08/171,237, which was filed on Dec. 21, 1993, now U.S. Pat. No. 5,397,140.

TECNICAL FIELD OF THE INVENTION

This invention pertains to a shopping cart of a type comprising an undercarriage, a handle having two tubular portions extending generally upwardly from the undercarriage, and a basket mounted to the handle and to the undercarriage, wherein the basket has a gate hinged to those portions of the handle. This invention contemplates that the gate is hinged to those portions of the handle in an improved manner.

BACKGROUND OF THE INVENTION

In a shopping cart of the type noted above, the basket has side, front, and bottom walls made of welded steel wires or of molded plastic panels or molded in one piece from a plastic material. Typically, the handle is made from one piece of bent steel tubing.

As hinged to the basket, the gate can be inwardly pivoted about a hinge axis at the upper edge of the basket, so as to permit a similar basket of a similar shopping cart to nest within the basket. Commonly, the gate is made of welded steel wires, which include a hinge wire extending along its upper edge. It is common for the gate to carry a foldable seat for an infant or a small child.

Conventionally, split rings of a type known as a hog ring are clamped around the hinge wire, near where the end portions of the hinge wire extend into inwardly opening apertures in the generally upwardly extending tubular portions of the handle. The hog rings are used to limit axial movement of the hinge wire and to retain the end portions of the hinge wire within those portions of the handle. Alternatively, it is known to use one hog ring, near where one end portion of the hinge wire extends into such an aperture.

In extensive or rough usage of the shopping cart, such a hog ring can open accidentally, whereupon the gate can be accidentally disassembled from the handle.

SUMMARY OF THE INVENTION

This invention provides a shopping cart comprising an undercarriage, a handle having two tubular portions extending upwardly from the undercarriage, and a basket mounted to the undercarriage and to the handle. The basket has a gate and a hinge wire extending along an upper edge of the gate. The gate is hinged to the handle in an improved manner.

Each such handle portion has an inwardly opening aperture and an outwardly opening aperture. The inwardly and outwardly opening apertures are aligned substantially with one another at both such handle portions. Two tubular sleeves are fixed to the handle, each extending through the inwardly opening aperture of an associated one of the tubular portions of the handle. Defining a hinge axis, the hinge wire has two end portions, each extending into an associated one of the tubular sleeves with sufficient clearance to enable the hinge wire to turn within the tubular sleeves.

Two retaining structures are fixed to the handle, each extending through the outwardly opening aperture of an associated one of the tubular portions of the handle, into an associated one of the tubular sleeves. The retaining structures are spaced axially so as to permit but limit axial movement of the hinge wire relative to the tubular sleeves.

In one contemplated embodiment, each tubular sleeve has an inner end portion disposed between the tubular portions of the handle, an intermediate portion disposed across an associated one of the tubular portions of the handle, and an outer end portion having an annular flange bearing against an outer margin of the outwardly opening aperture of an associated one of the tubular portions of the handle.

Preferably, in the foregoing embodiment, each retaining structure comprises a rivet having a head bearing against the annular flange of the tubular sleeve associated therewith, a tubular shank extending inwardly through the outwardly opening aperture of the tubular portion associated therewith, and a mandrel, over which the tubular shank is drawn so as to expand the tubular shank and the intermediate portion of the tubular sleeve associated therewith.

In an alternative embodiment, each tubular sleeve has an inner end portion disposed between both of the tubular portions of the handle and an outer end portion disposed within an associated one of the tubular portions of the handle. In the alternative embodiment, each tubular sleeve may be split lengthwise so as to have a generally C-shaped profile.

Preferably, in the alternative embodiment, each retaining structure comprises a rivet having a head outside the outwardly opening aperture of the tubular portion associated therewith, a tubular shank extending inwardly through the outwardly opening aperture thereof and through the tubular sleeve associated therewith, and a mandrel, over which the tubular shank is drawn so as to expand the tubular shank and so as to expand the outer end portion of the tubular sleeve associated therewith.

Although it is preferred that the basket and the gate be made from welded steel wires, the basket or the basket and the gate may be wholly or partially made from plastic materials.

These and other objects, features, and advantages of this invention are evident from the following description of two contemplated embodiments of this invention with reference to the accompanying drawings.

BRIEF DESCRIPTION OF THE DRAWINGS

FIG. 1 is a simplified, perspective view of a shopping cart embodying this invention.

FIG. 2, on a greatly enlarged scale, is a sectional view taken across two generally upwardly extending tubular portions of a handle of the shopping cart, showing a gate including a hinge wire, and showing two sleeves and two rivets, as used to retain the end portions of the hinge wire, in one contemplated embodiment of this invention.

FIG. 3, on a smaller scale compared to FIG. 2, is a fragmentary, exploded view showing how one of the handle portions, one of the tubular sleeves, one of the rivets, and the hinge wire are assembled, in the embodiment of FIG. 1.

FIG. 4, on an intermediate scale compared to FIGS. 2 and 3, is a sectional view taken along one of the handle portions and showing one of the rivets after it has been inserted and before its tubular shank is drawn over its mandrel and before a cylindrical stem is removed, in the embodiment of FIG. 1.

FIG. 5, which is analogous to FIG. 2, is a sectional view taken across two generally upwardly extending tubular portions of a handle of the shopping cart, showing a gate including a hinge wire, and showing two sleeves and two rivets, as used to retain the end portions of the hinge wire, in an alternative embodiment of this invention.

FIG. 6, which is analogous to FIG. 3, is a fragmentary, exploded view showing how one of the handle portions, one of the tubular sleeves, one of the rivets, and the hinge wire are assembled, in the embodiment of FIG. 5.

FIG. 7, which is analogous to FIG. 4, is a sectional view taken along one of the handle portions and showing one of the rivets after it has been inserted and before its tubular shank is drawn over its mandrel and before a cylindrical stem is removed, in the embodiment of FIG. 5.

FIG. 8 is a sectional view showing prior art employing hog rings to limit axial movement of a hinge wire and to retain the end portions of the hinge wire within two generally upwardly extending tubular portions of a handle of a shopping cart.

DETAILED DESCRIPTION OF ILLUSTRATED EMBODIMENTS

As shown in FIG. 1, a shopping cart 10 constituting a preferred embodiment of this invention comprises an undercarriage 12 with four caster wheels 14, a one-piece, tubular, steel handle 16 with two tubular portions 18 extending generally upwardly from the undercarriage 12 and a grip portion covered with an external grip 20 and joining the tubular portions 18 at their upper ends 22, and a basket 24 mounted to the undercarriage 12 and the handle 16. As shown, the basket 24 is made of welded wires. As disclosed in Jones et al. U.S. Pat. No. 5,255,930, the basket 24 may be alternatively made of molded plastic panels.

The basket 24 has a generally rectangular gate 26, which is made of welded wires, and which is hinged to the handle portions 18. The gate 26 may carry a foldable seat (not shown) of a type known heretofore, for an infant or a small child. The gate 26 is hinged to the handle portions 18, via a hinge wire 30 extending along the upper edge of the gate 26 and defining a hinge axis, so as to swing upwardly about the hinge axis to permit the basket of a similar cart (not shown) to nest into the basket 24. When the basket of a similar cart is not nested into the basket 24, the gate 26 is permitted to swing downwardly about the hinge axis so that the bottom edge of the gate 26 rests against a stop (not shown) at the bottom wall of the basket 24, near the rear edge of such wall. Such a stop is conventional.

As shown in FIG. 2, the hinge wire 30 has two end portions 32. Being tubular, each handle portion 18 defines a central axis. Moreover, each handle portion 18 has an inwardly opening aperture 34 in a dimpled area 36 in such handle portion 18 and an outwardly opening aperture 44 in a dimpled area 46 in such handle portion 18. The inwardly opening apertures 34 and the outwardly opening apertures 44 of both handle portions 18 are aligned substantially with one another.

At the inwardly opening apertures 34, the handle portions 18 are spaced from each other by a measurable distance. The hinge wire 30 is longer so as to permit each end portion 32 to extend outwardly into one of the handle portions 18 through the inwardly opening aperture 34 of such handle portion 18, approximately to the central axis defined by such handle portion 18, as shown in FIG. 2.

As shown in FIG. 5, in which elements designated by primed reference numbers are similar to elements designated by unprimed reference numbers in FIGS. 1 through 4, it is prior art to hinge a gate 26' to two generally upright tubular portions 18' of a handle 16' of a shopping cart 10' by causing each of two end portions 32' of a hinge wire 30' to extend outwardly through an inwardly opening aperture 34' in a dimpled area 36' in one of the handle portions 18' and by clamping two hog rings H around the hinge wire 30', near where the end portions 32' enter the apertures 34'. The hog rings H limit axial movement of the hinge wire 30' and retain the end portions 32' of the hinge wire 30' within the handle portions 18'. It also is prior art to extend the hinge wire 30 at one such end portion 32', as shown in dashed lines in FIG. 5, and to employ one hog ring H only, near where the opposite end portion 32' extends through such an aperture 34'.

As mentioned above, such a hog ring H can open accidentally in extensive or rough usage of the shopping cart 10', whereupon the gate 26' can be accidentally disassembled from the handle portions 18'. This invention, however, does not employ such a hog ring.

In the preferred embodiment of FIGS. 2, 3, and 4, two tubular sleeves 100 are fixed to the handle portions 18. Each tubular sleeve 100 has an outer end portion 102, an intermediate portion 104, and an inner end portion 106, and an annular flange 110 extending radially from the outer end portion 102. Each tubular sleeve 100 is inserted through the outwardly opening aperture 44 of one handle portion 18 and through the inwardly opening aperture 34 of the handle portion 18 so that the annular flange 110 of such sleeve 100 bears against the outer margin of such aperture 44, so that the intermediate portion 104 of such tubular sleeve 100 is disposed across the handle portion 18, and so that the inner end portion 106 of such sleeve 100 is disposed between the handle portions 18.

Furthermore, in the preferred embodiment, the shopping cart 10 further comprises two blind rivets 40 extending inwardly into the handle portions 18, each being associated with one of the tubular sleeves 100. Each rivet 40 has a head 50 bearing against the annular flange 110 of the tubular sleeve 100 associated with such rivet 40, a tubular shank 52 extending inwardly into the tubular sleeve 100 associated therewith, and a mandrel 54, over which the tubular shank 52 is drawn so as to expand the tubular shank 52 and the intermediate portion 104 of the tubular sleeve 100 associated with such rivet 40. As shown in FIG. 2, each rivet 40 extends approximately to the central axis defined by one of the handle portions 18, so as to position the hinge wire 30 approximately at a centered position relative to the handle portions 18.

As shown in FIGS. 3 and 4, each rivet 40 before its installation has an annular head 50, a tubular shank 52 extending from the annular head 50, a cylindrical mandrel 54 having an outer diameter that is larger than the inner diameter of the tubular shank 52 before the installation of such rivet 40, and an elongate stem 56 that is unitary with the cylindrical mandrel 54 before the installation of such rivet 40. The annular head 50 and the tubular shank 52 are made in one piece. The cylindrical mandrel 54 and the elongate stem 56 are made in one piece. The cylindrical mandrel 54 adjoins the elongate stem 56 at a frusto-conical shoulder 58. As shown in FIG. 4, the cylindrical stem 56 is provided with a series of annular grooves, which facilitate gripping of such stem 56. Suitable blind rivets are available commercially from Huck International, Inc. of Irvine, Calif., under Part Number MGLV-R8-UN.

Before the tubular sleeves 100 are inserted, the gate 26 is installed so that each of the end portions 32 of the hinge wire 30 extends into one of the handle portions 18, through one of the inwardly opening apertures 34. The hinge wire 30 is installed by inserting one end portion 32 into one aperture 34, in which a tubular sleeve 100 and a rivet 40 have not yet been inserted, shifting the hinge wire 30 axially into the same aperture 34 for a sufficient distance to permit the other end portion 32 to be then inserted into the other aperture 34, and shifting the hinge wire 30 axially and oppositely to insert the latter end portion 32 into the latter aperture 34. Thereupon, the tubular sleeves 100 are inserted, whereupon the rivets 40 are installed.

It is convenient to refer to each tubular sleeve 100 and the rivet 40 associated with such tubular sleeve 100 as a retaining structure. If one retaining structure comprised of a tubular sleeve 100 and a rivet 40 are installed before the gate 26 is installed, the other retaining structure comprising a tubular sleeve 100 and a rivet 40 are installed after the gate 26 has been installed. If neither retaining structure is installed before the gate 26 is installed, both rivets 40 are installed after the gate 26 has been installed.

When each rivet 40 is inserted inwardly into the tubular sleeve 100 associated with the handle portion 18 to have such rivet 40, the piece comprising the elongate stem 56 and the cylindrical mandrel 54 extends inwardly into the handle portion 18 to have such rivet 40. Moreover, the piece comprising the annular head 50 and the tubular shank 52 is disposed around the elongate stem 56 with the tubular shank 52 pointing toward the cylindrical mandrel 54. Next, a suitable tool (not shown) is used to grip the elongate stem 56 and to press the annular head 50 toward the cylindrical mandrel 54, so as to press the tubular shank 52 over the cylindrical mandrel 54. When the tubular shank 52 is pressed thereover, the cylindrical mandrel 54 expands the tubular shank 52 to secure such rivet 40. After the tubular shank 44 has been expanded, the elongate stem 56 is broken away from the cylindrical mandrel 54.

The annular head 40 of each rivet 40 is larger than the annular flange 110 of the tubular sleeve 100 associated therewith. The tubular shank 44 of each rivet 40, as expanded by the cylindrical mandrel 54, is larger than the associated aperture 44 and bears against the inner margin of the associated aperture 44. Thus, after each tubular sleeve 100 and each rivet 40 have been installed, each rivet 40 and the tubular sleeve 100 associated with such rivet 40 are fixed to the associated portion 18 of the handle 16.

At their inner ends 60, the cylindrical mandrels 54 of the respective rivets 40 define wear pads, which limit axial movement of the hinge wire 30 relative to the handle portions 18, retain the end portions 32 of the hinge wire 30 within the handle portions 18, and retain the hinge wire 30 approximately at a centered position relative to the handle portions 18.

In the alternative embodiment of FIGS. 5, 6, and 7, two tubular sleeves 200 are provided, which are fixed to the handle portions 18. Each tubular sleeve 200 extends into an associated one of the handle portions 18 through the inwardly opening aperture 34 of the associated portion 18. Each tubular sleeve 200 has an outer end portion 202, which is disposed within an associated one of the handle portions 18, and an inner end portion 206, which is disposed between the handle portions 18. As shown in FIG. 6, each tubular sleeve 200 is split lengthwise so as to define a narrow gap 230 extending lengthwise, whereby such sleeve 200 has a generally C-shaped profile.

Furthermore, in the alternative embodiment, the shopping cart 10 further comprises the blind rivets 40 described above extending inwardly into the handle portions 18, each being associated with one of the tubular sleeves 200. Each rivet 40 has a head 50 bearing against the outer margin of the outwardly opening aperture 44 of the handle portion 18 associated with such rivet 40, a tubular shank 52 extending inwardly through such aperture 44 into the tubular sleeve 100 associated therewith, and a mandrel 54, over which the tubular shank 52 is drawn so as to expand the tubular shank 52 and the outer end portion 106 of the tubular sleeve 200 associated with such rivet 40.

When each rivet 40 is inserted inwardly into the tubular sleeve 200 associated with the handle portion 18 to have such rivet 40, the piece comprising the elongate stem 56 and the cylindrical mandrel 54 extends inwardly into the handle portion 18 to have such rivet 40. Moreover, the piece comprising the annular head 50 and the tubular shank 52 is disposed around the elongate stem 56 with the tubular shank 52 pointing toward the cylindrical mandrel 54. Next, a suitable tool (not shown) is used to grip the elongate stem 56 and to press the annular head 50 toward the cylindrical mandrel 54, so as to press the tubular shank 52 over the cylindrical mandrel 54. When the tubular shank 52 is pressed thereover, the cylindrical mandrel 54 expands the tubular shank 52 to secure such rivet 40. After the tubular shank 44 has been expanded, the elongate stem 56 is broken away from the cylindrical mandrel 54.

Except as illustrated and described, the alternative embodiment of FIGS. 5, 6, and 7 is similar structurally to the preferred embodiment of FIGS. 2, 3, and 4 and functions similarly.

Various modifications may be made in the preferred embodiment described above without departing from the scope and spirit of this invention.

We claim:

1. A shopping cart comprising an undercarriage, a handle having two tubular portions extending generally upwardly from the undercarriage, and a basket mounted to the undercarriage and to the handle, the basket having a gate and a hinge wire extending along an upper edge of the gate, each such tubular handle portion having an inwardly opening aperture and an outwardly opening aperture, the inwardly and outwardly opening apertures being aligned substantially with one another at the tubular portions of the handle, two tubular sleeves being fixed to the handle, each tubular sleeve extending through the inwardly opening aperture of an associated one of the tubular portions of the handle, the hinge wire defining a hinge axis and having two end portions, each end portion extending into an associated one of the tubular sleeves with sufficient clearance to enable the hinge wire to turn within the tubular sleeves, two retaining structures being fixed to the handle, each retaining structure extending inwardly through the outwardly opening aperture of an associated one of the tubular portions of the handle, into an associated one of the tubular sleeves, the retaining structures being spaced axially so as to permit but limit axial movement of the hinge wire relative to the tubular sleeves, the tubular portions of the handle, and the retaining structures.

2. The shopping cart of claim 1 wherein each tubular sleeve has an inner end portion disposed between the tubular portions of the handle, an intermediate portion disposed across an associated one of the tubular portions of the handle, and an outer end portion having an annular flange bearing against an outer margin of the outwardly opening aperture of an associated one of the tubular portions of the handle.

3. The shopping cart of claim 2 wherein each retaining structure comprises a rivet having a head bearing against the annular flange of the tubular sleeve associated therewith, a tubular shank extending inwardly through the outwardly opening aperture of the tubular portion associated therewith, and a mandrel, over which the tubular shank is drawn so as to expand the tubular shank and the intermediate portion of the tubular sleeve associated therewith.

4. The shopping cart of claim 1 wherein each tubular sleeve has an inner end portion disposed between both of the tubular portions of the handle and an outer end portion disposed within an associated one of the tubular portions of the handle.

5. The shopping cart of claim 4 wherein each retaining structure comprises a rivet having a head outside the outwardly opening aperture of the tubular portion associated therewith, a tubular shank extending inwardly through the outwardly opening aperture thereof and through the tubular sleeve associated therewith, and a mandrel, over which the tubular shank is drawn so as to expand the tubular shank and so as to expand the outer end portion of the tubular sleeve associated therewith.

6. The shopping cart of claim 5 wherein each tubular sleeve has a generally C-shaped profile.

* * * * *

UNITED STATES PATENT AND TRADEMARK OFFICE
CERTIFICATE OF CORRECTION

PATENT NO. : 5,470,087

DATED : November 28, 1995

INVENTOR(S) : Tommy D. Mainard and James F. Reinbold

It is certified that error appears in the above-indentified patent and that said Letters Patent is hereby corrected as shown below:

Column 5, line 37, "44" should be --52--;

Column 5, line 39, "40" should be --50--; (1st occurrence)

Column 5, line 41, "44" should be --52--;

Column 5, line 43, "44" should be --34--;

Column 5, line 44, "44" should be --34--;

Column 6, line 11, "106" should be --102--; and

Column 6, line 27, "44" should be --52--.

Signed and Sealed this

Second Day of July, 1996

Attest:

BRUCE LEHMAN

*Attesting Officer*   *Commissioner of Patents and Trademarks*